(12) United States Patent
Tohzaka et al.

(10) Patent No.: US 9,445,433 B2
(45) Date of Patent: Sep. 13, 2016

(54) WIRELESS COMMUNICATION APPARATUS FOR LOWER LATENCY COMMUNICATION

(71) Applicant: KABUSHIKI KAISHA TOSHIBA, Minato-ku, Tokyo (JP)

(72) Inventors: Yuji Tohzaka, Kawasaki (JP); Takafumi Sakamoto, Machida (JP); Ikuya Aoyama, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/187,122

(22) Filed: Feb. 21, 2014

(65) Prior Publication Data

US 2014/0241270 A1  Aug. 28, 2014

(30) Foreign Application Priority Data

Feb. 27, 2013  (JP) .................................. 2013-036955

(51) Int. Cl.
*H04W 74/08* (2009.01)

(52) U.S. Cl.
CPC ..... *H04W 74/0808* (2013.01); *H04W 74/0816* (2013.01)

(58) Field of Classification Search
CPC ........... H04N 1/0022; H04N 1/32789; H04N 2201/0093; H04W 74/0808; H04W 74/0816
USPC ........................... 370/254–350; 709/201–213
See application file for complete search history.

(56) References Cited

U.S. PATENT DOCUMENTS

| | | | | |
|---|---|---|---|---|
| 6,751,231 | B2 * | 6/2004 | Fellman et al. | 370/437 |
| 6,813,244 | B1 * | 11/2004 | He et al. | 370/235 |
| 7,864,816 | B1 * | 1/2011 | Cohen | 370/516 |
| 8,068,429 | B2 * | 11/2011 | Rittmeyer et al. | 370/241 |
| 2002/0046273 | A1 * | 4/2002 | Lahr et al. | 709/224 |
| 2005/0070270 | A1 * | 3/2005 | Akiyama | 455/425 |
| 2005/0089002 | A1 * | 4/2005 | Shin et al. | 370/338 |
| 2005/0232154 | A1 * | 10/2005 | Bang et al. | 370/235 |

FOREIGN PATENT DOCUMENTS

JP  2007-235445 A  9/2007

* cited by examiner

*Primary Examiner* — Debebe Asefa
(74) *Attorney, Agent, or Firm* — Holtz, Holtz & Volek PC

(57) ABSTRACT

According to an embodiment, a wireless communication apparatus includes a packet generator, a queue unit, a predictor and a scheduler. The packet generator packetizes data. The queue unit temporarily stores a packet to be transmitted. The predictor predicts a transmission time of a first packet to obtain a first time. The scheduler outputs a second packet to the queue unit at a second time earlier than the first time. An interval from a third time when transmission of the second packet is complete until the first time is equal to or shorter than a predetermined period.

15 Claims, 11 Drawing Sheets

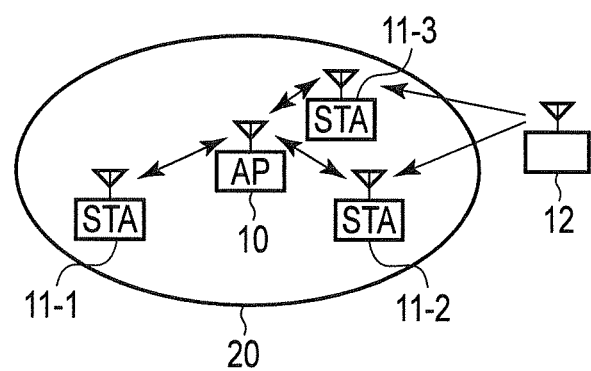
F I G. 1

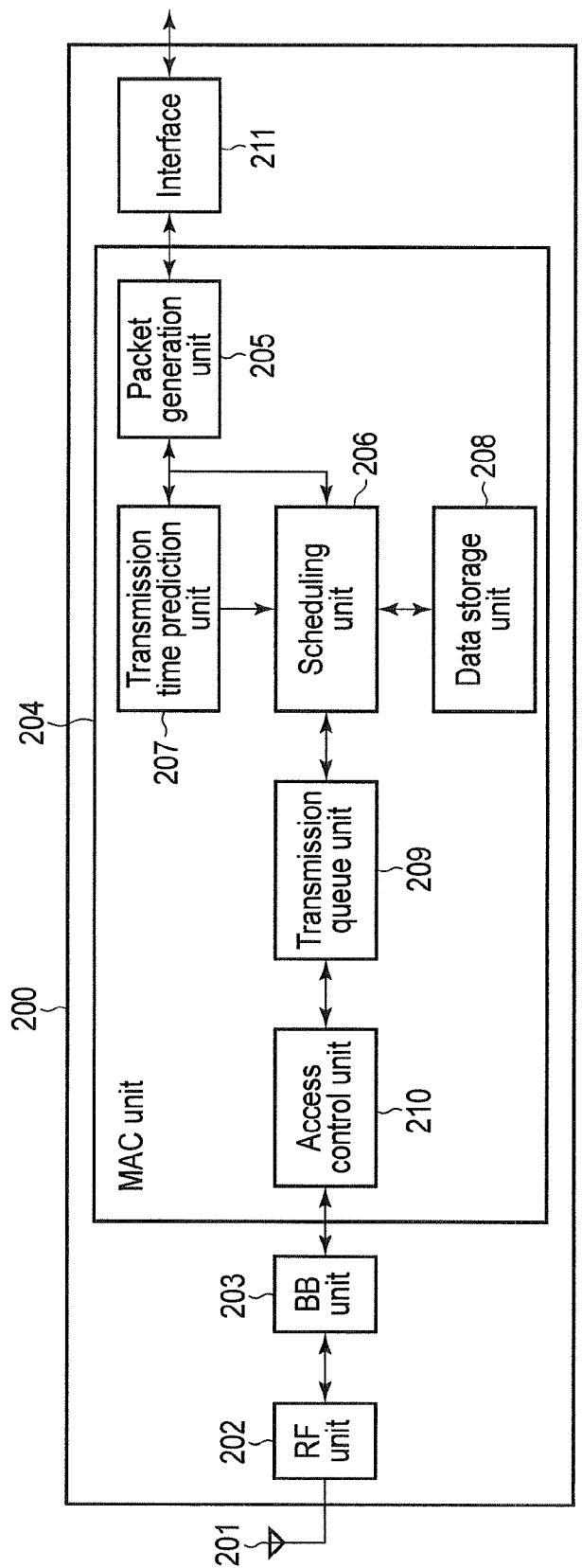
F I G. 2

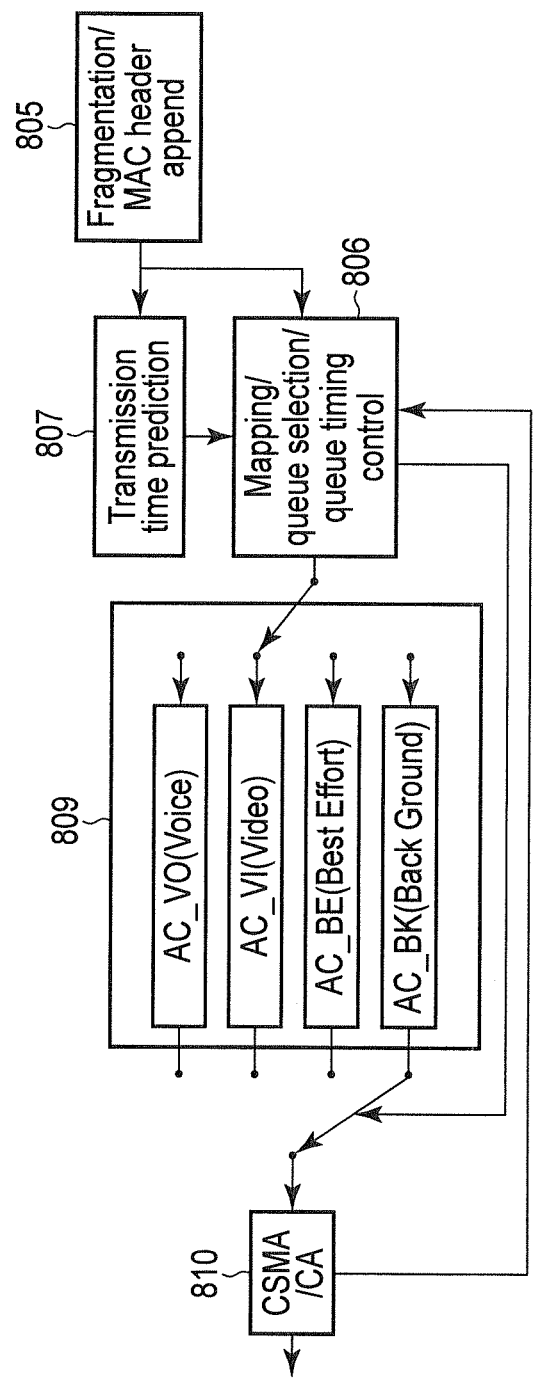
F I G. 8

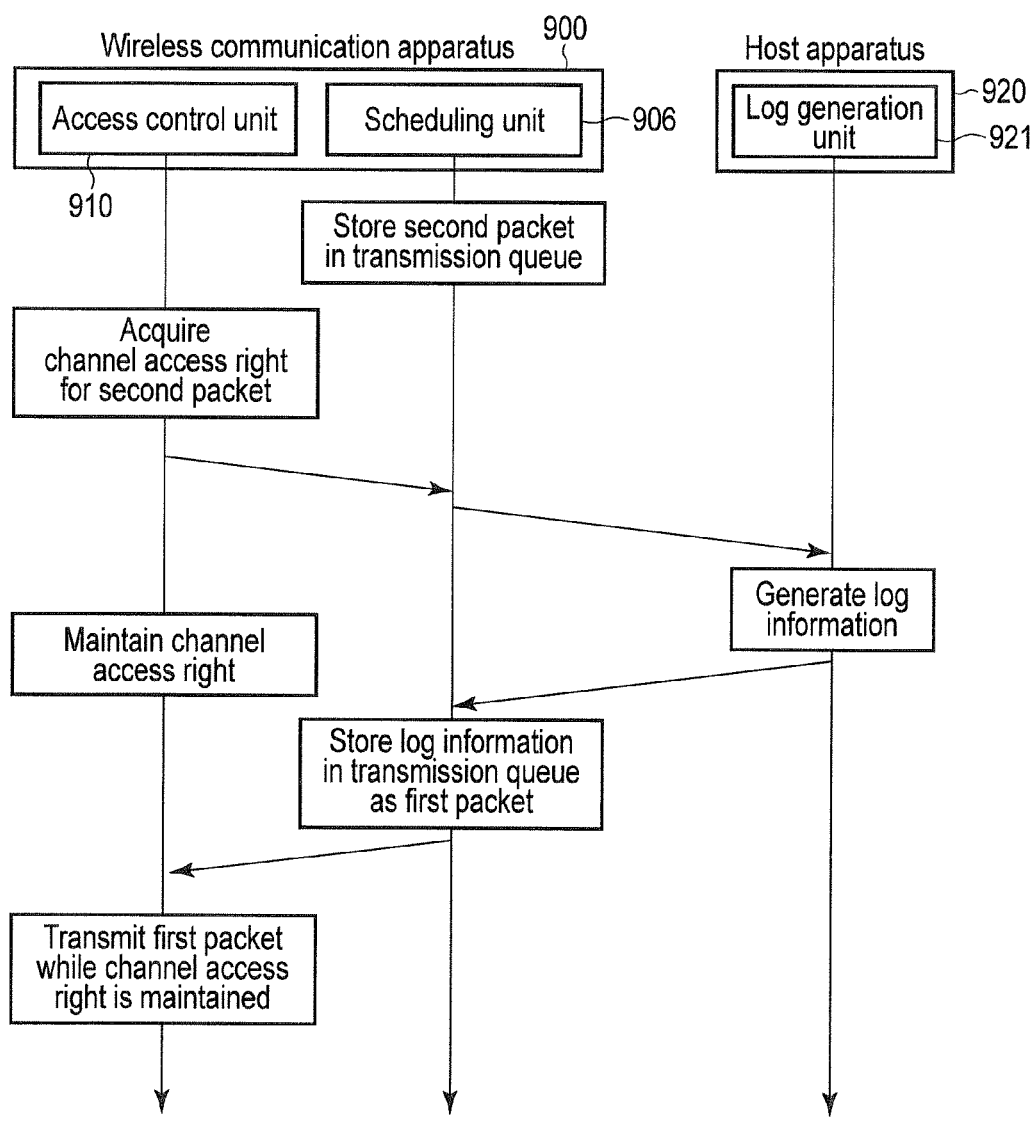
F I G. 10

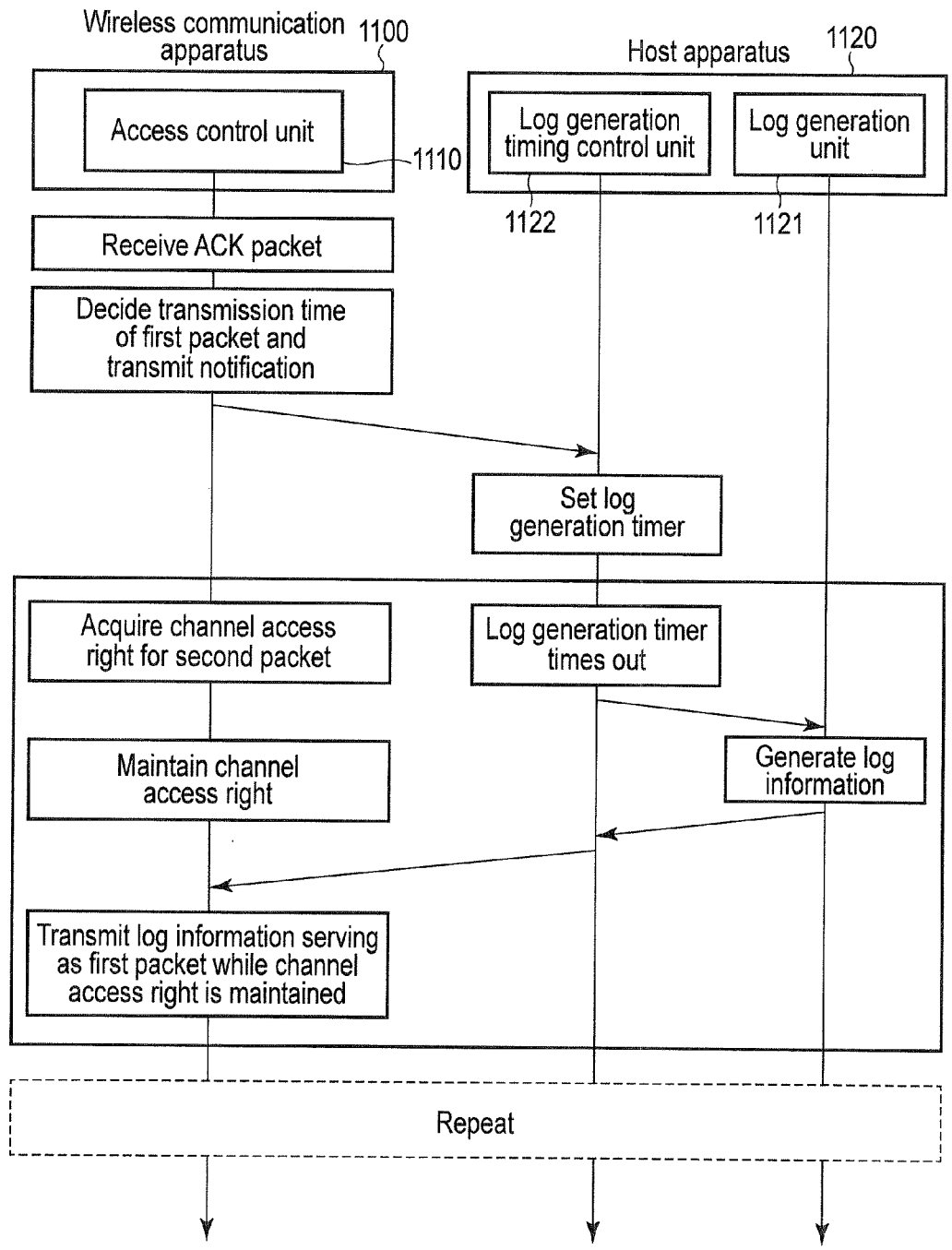
F I G. 12

WIRELESS COMMUNICATION APPARATUS FOR LOWER LATENCY COMMUNICATION

CROSS-REFERENCE TO RELATED APPLICATIONS

This application is based upon and claims the benefit of priority from Japanese Patent Application No. 2013-036955, filed Feb. 27, 2013, the entire contents of which are incorporated herein by reference.

FIELD

Embodiments relate to communication.

BACKGROUND

A technique for a wireless communication system based on a Carrier Sense Multiple Access (CSMA) scheme is conventionally known by which a plurality of communication terminals periodically transmitting wireless packets to an access point autonomously decide transmission times of the wireless packets.

However, the technique is intended to avoid packet collisions inside a cell provided by the access point. That is, the technique fails to take into account interference from a communication terminal outside the cell. Hence, when the communication terminal outside the cell transmits a wireless packet that may cause interference, the communication terminal inside the cell may determine, during carrier sense, that a relevant channel is in a busy state. As a result, the communication terminal inside the cell may delay transmission of its wireless packet. Thus, the actual transmission time of the wireless packet may be much later than the decided transmission time.

BRIEF DESCRIPTION OF THE DRAWINGS

FIG. 1 is a diagram illustrating a wireless communication system including a wireless communication apparatus according to a first embodiment to a fourth embodiment;

FIG. 2 is a block diagram illustrating a wireless communication apparatus according to the first embodiment;

FIG. 8 is a diagram illustrating functions of a MAC unit in FIG. 7;

FIG. 10 is a sequence diagram illustrating operation of the logging system in FIG. 9;

FIG. 12 is a sequence diagram illustrating operation of the logging system in FIG. 11.

DETAILED DESCRIPTION

Figure 3:
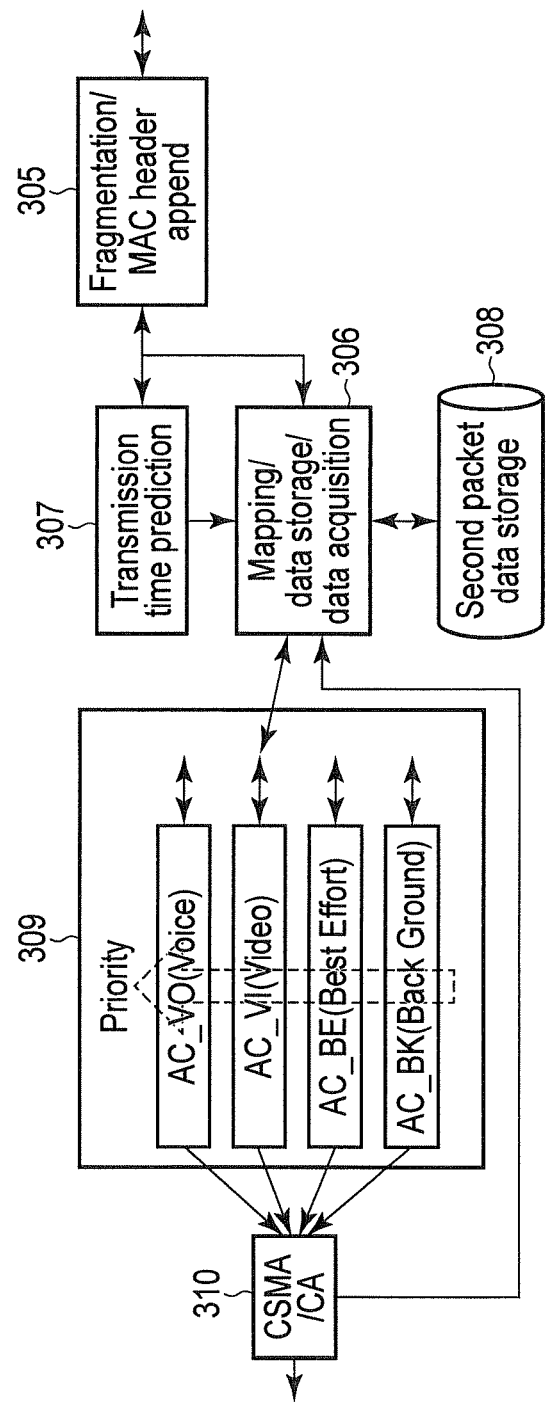
FIG. 3 is a diagram illustrating a Media Access Control (MAC) unit in FIG. 2.

Embodiments will be described below with reference to the drawings.

According to an embodiment, a wireless communication apparatus includes a packet generator, a queue unit, a predictor and a scheduler. The packet generator packetizes data. The queue unit temporarily stores a packet to be transmitted. The predictor predicts a transmission time of a first packet to obtain a first time. The scheduler outputs a second packet to the queue unit at a second time earlier than the first time. An interval from a third time when transmission of the second packet is complete until the first time is equal to or shorter than a predetermined period.

Elements identical or similar to described elements are denoted by identical or similar reference numerals, and duplicate descriptions are basically omitted.

First Embodiment

A wireless communication apparatus according to a first embodiment is, for example, included in a wireless communication system shown in FIG. 1. The wireless communication system in FIG. 1 corresponds to a wireless Local Area Network (LAN) centered around an Access Point (AP) 10. The AP 10 provides a cell 20. Each of three STAtions (STA) 11-1, 11-2, and 11-3 arranged in the cell 20 is connected to the AP 10 and transmits and receives packets to and from the AP 10. Some or all of the STAs 11-1, 11-2, and 11-3 and the AP 10 in FIG. 1 correspond to the wireless communication apparatus according to the first embodiment.

In the wireless communication system in FIG. 1, the AP 10 and the STAs 11-1, 11-2, and 11-3 communicate in accordance with a CSMA scheme. Thus, the AP 10 and STAs 11-1, 11-2, and 11-3 carry out carrier sense before transmitting a packet. When a relevant channel is determined to be in a busy state, the transmission of the packet is delayed.

Specifically, the carrier sense involves comparing reception power with a threshold called a carrier sense level. When the reception power is equal to or higher than the carrier sense level, the channel is determined to be in the busy state. When the reception power is lower than the carrier sense level, the channel is determined to be in an idle state.

In short, the carrier sense is carried out based on the reception power. Hence, when a wireless communication apparatus 12 arranged outside the cell 20 transmits a packet on the same channel as that used in the cell 20, the AP 10 or the STA 11-1, 11-2, or 11-3 in the cell 20 may determine that the channel is in the busy state depending on the reception power of the packet. As a result, transmission of the packet is delayed. In particular, some packets, for example, voice packets, involve only a small amount of allowable delay, and the delay of transmission of these packets is not preferable.

To allow a packet involving only a small amount of allowable delay to be transmitted with a possible delay reduced, the wireless communication apparatus according to the first embodiment acquires a channel access right before transmitting the packet and maintains the channel access right until the packet is transmitted. The wireless communication apparatus is operable within the framework of the existing CSMA scheme.

The wireless communication system in FIG. 1 corresponds to a wireless LAN system involving communication in accordance with IEEE 802.11. However, the first embodiment is applicable to any other wireless communication system adopting the CSMA scheme. For example, the first embodiment is applicable to a ZigBee (registered trade mark) system involving communication in accordance with IEEE 802.15.4.

Moreover, the first embodiment can be applied to a wired communication system by appropriately interchanging "wireless communication" with "wired communication". The first embodiment is also applicable to, for example, a wired communication system based on a CSMA/Collision Detection (CD) scheme adopted for Ethernet (registered trade mark).

As illustrated in FIG. 2, a wireless communication apparatus 200 according to the first embodiment comprises an antenna 201, a Radio Frequency (RF) unit 202, a Baseband (BB) unit 203, a MAC unit 204, and an interface 211.

FIG. 2 depicts functional units basically related to transmission of packets. However, the wireless communication apparatus 200 may comprise functional units related to reception of packets as necessary. Furthermore, as described above, some or all of the STAs 11-1, 11-2, and 11-3 and the AP 10 in FIG. 1 may correspond to the wireless communication apparatus 200 in FIG. 2.

The antenna 201 transmits and receives RF signals. The RF unit 202 carries out common analog signal processing for wireless communication. The wireless communication apparatus 200 communicates in accordance with the CSMA scheme. Hence, the RF unit 202 carries out carrier sense, and notifies the MAC unit 204 (more specifically an access control unit 210 described below) of the result of the carrier sense (information indicating whether the channel is in the busy state or the idle state). The BB unit 203 carries out a common baseband process for wireless communication. The baseband process includes, for example, encoding and modulation of a packet.

The MAC unit 204 carries out various processes described below in addition to the common MAC process for wireless communication. The MAC unit 204 comprises a packet generation unit 205, a scheduling unit 206, a transmission time prediction unit 207, a data storage unit 208, a transmission queue unit 209, and an access control unit 210.

The MAC unit 204 can be implemented using a Central Processing Unit (CPU). Specifically, the packet generation unit 205, the scheduling unit 206, the transmission time prediction unit 207, and the access control unit 210 can be implemented by the CPU by executing corresponding programs. Furthermore, each of the data storage unit 208 and the transmission queue unit 209 can be implemented by a storage medium such as a random access memory (RAM).

The interface 211 connects the MAC unit 204 to a higher signal processing unit (not shown in the drawings) or a host apparatus.

The functions of the MAC unit 204 can be described with reference to, for example, FIG. 3.

The packet generation unit 205 inputs data from the higher signal processing unit (not shown in the drawings) or the host apparatus via an interface 211. The packet generation unit 205 carries out a fragmentation process on input data and appends a MAC header to the processed input data to generate a MAC packet (MAC frame) (305). That is, the packet generation unit 205 packetizes the input data to generate a MAC packet (hereinafter simply referred to as a packet). The packet generation unit 205 outputs the packet to the scheduling unit 206.

The scheduling unit 206 inputs the packet from the packet generation unit 205. The scheduling unit 206 outputs this input packet to one of a plurality of queues provided in the transmission queue unit 209 (mapping) (306).

Specifically, the scheduling unit 206 determines whether or not the input packet corresponds to a second packet described below. If the input packet corresponds to the second packet, the scheduling unit 206 stores the second packet in the data storage unit 208 (306). In this case, the second packet preferably involves a larger amount of allowable delay than a first packet described below.

The scheduling unit 206 inputs information indicative of a predicted transmission time of the first packet from the transmission time prediction unit 207. Then, the scheduling unit 206 operates to allow a packet other than the first packet (for example, the second packet) to be transmitted a predetermined time before the predicted transmission time.

For example, if data to be transmitted the predetermined time before the predicted transmission time is not stored in the transmission queue unit 209, the scheduling unit 206 acquires the second packet from the data storage unit 208 and outputs the acquired second packet to one of the plurality of queues provided in the transmission queue unit 209 (306). On the other hand, if the data to be transmitted the predetermined time before the predicted transmission time is stored in the transmission queue unit 209, the scheduling unit 206 need not read the second packet from the data storage unit 208.

Moreover, upon determining that the input packet does not correspond to the second packet (or the input packet corresponds to the first packet), the scheduling unit 206 outputs the input packet to one of the plurality of queues provided in the transmission queue unit 209 instead of the data storage unit 208 (306). It should be noted that when the input packet does not correspond to the first packet or to the second packet, the scheduling unit 206 needs to controllably prevent the transmission time of the input packet from overlapping the predicted transmission time of the first packet.

The scheduling unit 206 may determine whether or not the input packet corresponds to the first packet based on the priority of the input packet. In general, the priority of the input packet is associated with the Quality of Service (QoS) or Access Category (AC) of the input packet. The scheduling unit 206 may determine that the input packet corresponds to the first packet when the priority of the input packet is higher than a first value. Moreover, the scheduling unit 206 may determine that the input packet corresponds to the second packet when the priority of the input packet is lower than a second value that is equal to or smaller than a first value.

The scheduling unit 206 need not faithfully map the second packet to the priority. The second packet generally has a low priority but is preferably immediately transferred from the transmission queue unit 209 to the access control unit 210 in order to more reliably acquire the channel access right. Hence, the scheduling unit 206 may map the second packet to a queue with a high priority. Such mapping restrains the transmission of the second packet from being delayed. This enables a reduction in the frequency of a process of adjusting the length of the second packet as described below.

The transmission time prediction unit 207 predicts the transmission time of the first packet to obtain a predicted transmission time (307). The transmission time prediction unit 207 outputs information indicative of the predicted transmission time to the scheduling unit 206.

For example, when the first packet is periodically transmitted in accordance with a certain period, a user or an operator may manually set the transmission time of the first packet, and the transmission time prediction unit 207 may predict the transmission time of the first packet by acquiring information on the set transmission time. Alternatively, the user or the operator may manually set a transmission period or the first transmission time, and the transmission time prediction unit 207 may predict the transmission time of the first packet based on the set transmission period or transmission time.

The transmission time prediction unit 207 may predict the transmission time of the first packet by analyzing a pattern of occurrence of the first packet based on histories of occurrence of a plurality of past packets. The transmission time prediction unit 207 may predict the transmission time of the first packet based on a rule that the first packet is generated a given period after reception of a particular packet. Such a rule may be manually set by the user or the operator.

The data storage unit 208 temporarily stores the second packet from the scheduling unit 206 (308). Furthermore, the second packet stored in the data storage unit 208 is read by the scheduling unit 206 as necessary. Specifically, in order to transmit the second packet before transmitting the first packet, scheduling unit 206 reads the second packet stored in the data storage unit 208. The transmission of the second packet is subjected to a delay corresponding to the period for which the second packet is stored in the data storage unit 208, and thus, the second packet preferably involves a large amount of allowable delay.

The transmission queue unit 209 comprises the plurality of queues with different priorities. The plurality of queues temporarily store packets to be transmitted. In an example illustrated in FIG. 3, the transmission queue unit 209 comprises four queues AC_VO (Voice), AC_VI (Video), AC_BE (Best Effort), and AC_BK (Back Ground) (309).

The four queues illustrated in FIG. 3 are based on an Enhanced Distributed Channel Access (EDCA) scheme specified to implement QoS in accordance with IEEE 802.11e. According to the EDCA scheme, a packet is classified as one of four types of ACs and is stored in (mapped to) a queue corresponding to the classified AC. A packet is classified as one of the four types of ACs, for example, based on a priority value in a Type of Service (ToS) field or a DiffSery (DS) field in an Internet Protocol (IP) header of the packet. A packet stored in a queue with a higher priority is transmitted earlier. For example, when a plurality of packets are to be transmitted at the same transmission time, the packets are transmitted in turn in order of decreasing priority of the queue in which each of the packets is stored.

According to the EDCA, a parameter is set for each AC, and the priority can be adjusted by changing the set value of the parameter. As such a parameter, the following are known: the minimum value (CWmin) and maximum value (CWmax) of a Contention Window (CW), an Arbitration Inter Frame Space (AIFS), and a Transmission Opportunity (TXOP) Limit (also referred to as a channel occupancy time).

For the second packet transmitted before the first packet, the TXOP Limit needs to be set to an appropriate value. In particular, when the TXOP Limit is 0, the second packet and the first packet fail to be consecutively transmitted in this order. Thus, the TXOP Limit needs to be set to a sufficiently large value to allow the second packet and first packet to be consecutively transmitted in this order.

The access control unit 210 performs access control in accordance with the CSMA scheme (310). The access control unit 210 may perform the same access control as that for common wireless LANs. Specifically, when the RF unit 202 continuously determines, over an IFS period, that the channel is in the idle state, the access control unit 210 acquires the channel access right after a random backoff period dictated by random numbers. Upon acquiring the channel access right, the access control unit 210 inputs a packet from the transmission queue unit 209 and outputs this input packet to the BB unit 203 for transmission. Furthermore, when a packet collision occurs, the access control unit 210 decides a packet wait time based on the result of carrier sense. The access control unit 210 delays transmission of the packet by the wait time and notifies the scheduling unit 206 of the wait time.

Upon receiving the notification of the wait time for the second packet, the scheduling unit 206 may adjust the length of the second packet so that the length is suitable for an interval between the delayed transmission time and the predicted transmission time of the first packet. Specifically, the scheduling unit 206 may allow the packet generation unit 205 to carry out a re-fragmentation process on the second packet or allow the BB unit 203 to change a coding rate or a modulation scheme applied to the second packet. When the re-fragmentation process is carried out on the second packet, the scheduling unit 206 needs to replace the second packet stored in the storage medium in the access control unit 210 or in the transmission queue unit 209 with the second packet with the length adjusted through the re-fragmentation process.

The MAC unit 204 needs to transmit the first packet with a possible delay reduced. That is, the MAC unit 204 ideally maintains the channel access right until the transmission time of the first packet regardless of the time at which an interfering wireless communication apparatus transmits an interfering packet.

To allow the channel access right to be maintained until the transmission time of the first packet, the length and transmission time of the second packet transmitted before the first packet needs to be appropriately designed. In this case, the predicted transmission time is denoted by ttx, the maximum length of the interfering packet is denoted by Tmax_ifs, and the time for which the second packet waits during a channel access (that is, (fixed wait time+random backoff period) in accordance with the CSMA scheme) is denoted by TCMSA. The Tmax_ifs may be a design value, and a design technique will be described below.

In this case, the second packet is preferably output from the transmission queue unit 209 to the access control unit 210 at a time represented by ttx−(Tmax_ifs+TCMSA). The length of the second packet (the length from the beginning of transmission of the second packet until the completion of the transmission) is preferably equal to the maximum length Tmax_ifs of the interfering packet minus the interval from the completion of transmission of the second packet until the beginning of transmission of the first packet.

According to the CSMA scheme, when continuously determining that the channel is in the idle state for a predetermined period after the completion of transmission of the second packet, the interfering wireless communication apparatus may transmit the interfering packet before the MAC unit 204 transmits the first packet.

Hence, the interval from the completion of transmission of the second packet until the beginning of transmission of the first packet is desirably equal to or shorter than the predetermined period. Specifically, when continuously determining that the channel is in the idle state over an AIFS slot at shortest, the interfering wireless communication apparatus may start transmitting the interfering packet. Thus, the interval may be equal to or shorter than the minimum value of an AIFS slot that is likely to be adopted for the interfering wireless communication apparatus. The slot means a time unit for random backoff.

For example, according to a design in which the second packet and the first packet are consecutively transmitted in this order, the interval may be the minimum IFS that can be set for a wireless LAN. Alternatively, according to a design in which a random backoff period preceding transmission of the first packet is provided, the interval may be the minimum IFS plus the random backoff period. Although the random backoff period is dictated by random numbers, the first upper limit value can be adjusted through the above-described parameter CWmin. Thus, setting the CWmin to the minimum value allows the channel access right to be more reliably maintained. Furthermore, for a further reduction in the interval, the interval may be set equal to a Reducing IFS (RIFS) specified as a packet interval for consecutive transmission of packets in IEEE 802.11n.

When the length and transmission time of the second packet are appropriate, regardless of the time at which an interfering packet with the maximum length (=Tmax_ifs) is transmitted, the channel access right can be maintained at least until the predicted transmission time (=ttx).

The length of the second packet can be adjusted by a fragmentation process carried out by the packet generation unit 205 or through setting of the coding rate or modulation scheme carried out by the BB unit 203. If no second packet with the appropriate length is stored in the data storage unit 208, the scheduling unit 206 may output dummy data with the appropriate length to the transmission queue unit 209 as the second packet The maximum length Tmax_ifs of the interfering packet may be estimated by various means. For example, the Tmax_ifs may be estimated to be the maximum length of packets which can be set for a wireless communication system based on the CSMA scheme such as a wireless LAN or ZigBee. Alternatively, the Tmax_ifs may be statistically estimated. Specifically, the Tmax_ifs may be estimated to be the maximum length of time for which the channel is continuously determined to be in the busy state during carrier sense carried out for a sufficiently long time.

Moreover, the Tmax_ifs may be designed taking into account the number of wireless communication apparatuses in the wireless communication system and the amount of data communicated between the wireless communication apparatuses. For example, in a wireless communication system formed by one AP and 9 STAs, it is assumed that each of a total of 10 wireless communication apparatuses transmits a first packet with a length of 200 μs at a period of 10 ms and that the transmission times of the first packet are scheduled at equal intervals. In this case, an interval of 800 μs is present between the completion of transmission of the first packet by one wireless communication apparatus until the beginning of transmission of the first packet by another wireless communication apparatus. For simplification, the IFS period is neglected. For example, obviously, setting the second packet equal to or longer than 800 μs disrupts the schedule. Thus, in this example, the Tmax_ifs is preferably set equal to shorter than 800 μs in order to implement the above-described number of wireless communication apparatuses accommodated in the wireless communication system and the above-described amount of data communicated between the wireless communication apparatuses.

However, the actual length of the interfering packet may be longer than the Tmax_ifs designed taking into account the number of wireless communication apparatuses accommodated in the wireless communication system and the amount of data communicated between the wireless communication apparatuses. Thus, when the Tmax_ifs is designed as described above, the channel is preferably appropriately selected. Specifically, when carrier sense is carried out on each of selectable channels for a sufficiently long period, the maximum length of the interfering packet can be estimated for the channel. Then, the wireless communication system may preferentially select a channel on which the interfering packet has a short maximum length. Preferably, a channel is selected on which the interfering packet has an estimated maximum length equal to or shorter than Tmax_ifs.

Figure 4:
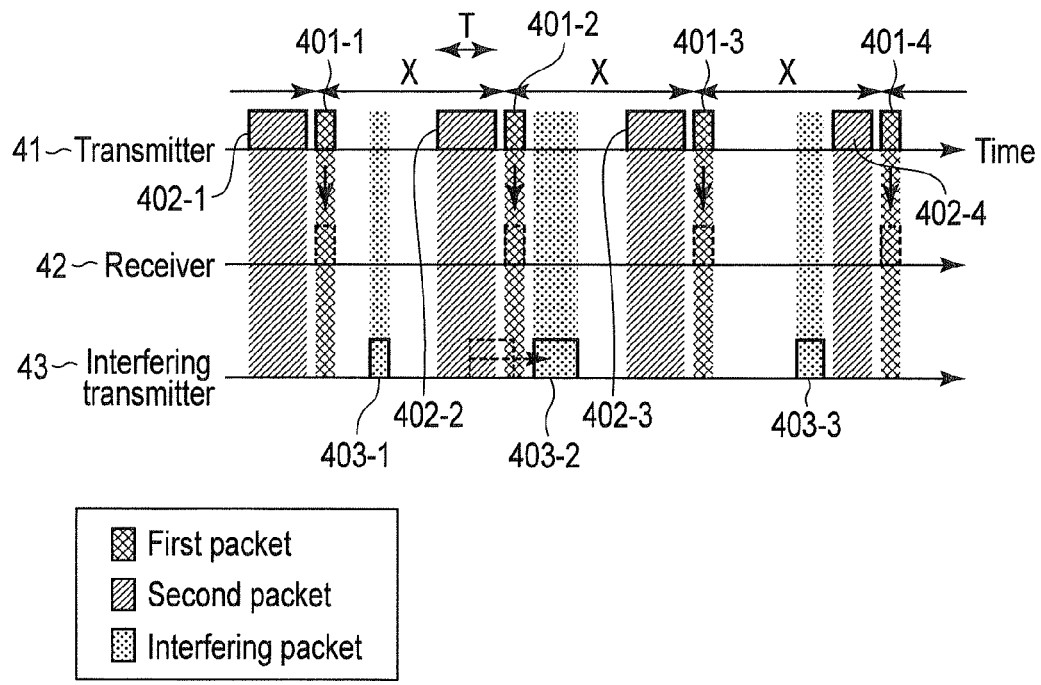
FIG. 4 is a diagram illustrating operation of the wireless communication apparatus according to the first embodiment to the fourth embodiment.

The wireless communication apparatus according to the first embodiment may operate as illustrated in FIG. 4. A transmitter 41 in FIG. 4 corresponds to the wireless communication apparatus according to the first embodiment. Furthermore, a receiver 42 may correspond to the wireless communication apparatus according to the first embodiment. Moreover, an interfering transmitter 43 carries out at least communication based on the CSMA scheme. The interfering transmitter 43 may correspond to the wireless communication apparatus according to the first embodiment.

The transmitter 41 desirably transmits first packets 401-1, 401-2, 401-3, and 401-4 with a possible delay reduced. In an example illustrated in FIG. 4, the first packets 401-1, 401-2, 401-3, and 401-4 are assumed to be periodically transmitted in accordance with a period X.

The transmitter 41 predicts the transmission times of the first packets 401-1, 401-2, 401-3, and 401-4. The transmitter 41 transmits second packets 402-1, 402-2, 402-3, and 402-4 before transmitting the first packets 401-1, 401-2, 401-3, and 401-4 so as to maintain the channel access right at the predicted transmission times of the first packets 401-1, 401-2, 401-3, and 401-4. While the acquired channel access right for each of the second packets 402-1, 402-2, 402-3, and 402-4 is maintained, the transmitter 41 transmits each of the first packets 401-1, 401-2, 401-3, and 401-4. Through this operation, the transmitter 41 can transmit the first packets 401-1, 401-2, 401-3, and 401-4 with a possible delay reduced.

The interfering transmitter 43 transmits interfering packets 403-1, 403-2, and 403-3. The transmission time of the interfering packet 403-1 does not overlap any of the transmission times of the first packets 401-1, 401-2, 401-3, and 401-4 and the transmission times of the second packets 402-1, 402-2, 402-3, and 402-4. Hence, the interfering packet 403-1 is transmitted without delay and does not delay any of the transmissions of the first packets 401-1, 401-2, 401-3, and 401-4 and the second packets 402-1, 402-2, 402-3, and 402-4.

The second packet 402-2 is transmitted at the scheduled transmission time of the interfering packet 403-2. The interfering transmitter 43 determines that the channel is in the busy state depending on the reception power of the second packet 402-2, and thus delays the transmission of the interfering packet 403-2. Then, as described above, the transmitter 41 transmits the first packet 401-2 while the channel access right acquired for the second packet 402-2 is maintained. Hence, the interfering transmitter 43 is precluded from transmitting the interfering packet 403-2 at least until the transmission of the first packet 401-2 is complete.

The interfering packet 403-3 is transmitted at the scheduled transmission time of the second packet 402-4 preceding the first packet 401-4. The transmitter 41 determines that the channel is in the busy state depending on the reception power of the interfering packet 403-3, and thus delays the transmission of the second packet 402-4. In this case, when the transmission of the second packet 402-4 is simply delayed, the transmission of the succeeding first packet 401-4 is inevitably delayed. Thus, the transmitter 41 transmits the succeeding first packet 401-4 with the delay reduced by shortening the second packet 402-4.

For example, the transmitter 41 shortens the second packet 402-4 by carrying out a re-fragmentation process on the second packet 402-4 or changing the coding rate or the modulation scheme applied to the second packet 402-4.

The number of second packets transmitted before the first packet is not limited to one, and a plurality of second packets may be transmitted before the first packet. A plurality of second packets are preferably consecutively transmitted. It should be noted that, when a plurality of second packets are transmitted before the first packet, the plurality of second packets as a whole correspond to one second packet in a case where only this second packet is transmitted before the first packet. That is, the leading packet of the plurality of second packets is preferably output at the time ttx−(Tmax_ifs+TCMSA) from the transmission queue unit 209 to the access control unit 210. Furthermore, the length of the plurality of second packets (that is, the length from the beginning of transmission of the leading second packet to the completion of transmission of the trailing second packet) is equal to the Tmax_ifs, the maximum length of the interfering packet, minus the interval from the completion of transmission of the trailing second packet until the beginning of transmission of the first packet.

Figure 5:
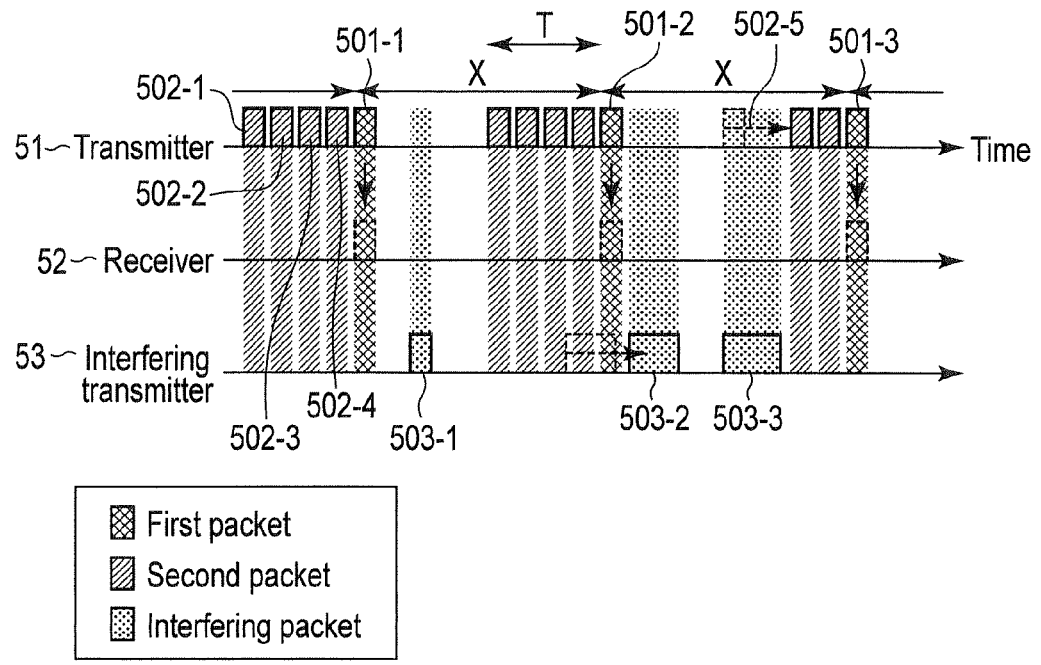
FIG. 5 is a diagram illustrating the operation of the wireless communication apparatus according to the first embodiment to the fourth embodiment.

Specifically, the wireless communication apparatus according to the first embodiment may operate as illustrated in FIG. 5. A transmitter 51 in FIG. 5 corresponds to the wireless communication apparatus according to the first embodiment. Furthermore, a receiver 52 may correspond to the wireless communication apparatus according to the first embodiment. Moreover, an interfering transmitter 53 carries out at least communication based on the CSMA scheme. The interfering transmitter 53 may correspond to the wireless communication apparatus according to the first embodiment.

The transmitter 51 desirably transmits first packets 501-1, 501-2, and 501-3 with a possible delay reduced. In an example illustrated in FIG. 5, the first packets 501-1, 501-2, and 501-3 are assumed to be periodically transmitted in accordance with the period X.

The transmitter 51 predicts the transmission times of the first packets 501-1, 501-2, and 501-3. The transmitter 51 transmits a plurality of second packets before transmitting the first packets 501-1, 501-2, and 501-3 so as to maintain the channel access right at the predicted transmission times of the first packets 501-1, 501-2, and 501-3. For example, while the acquired channel access right for second packets 502-1, 502-2, 502-3, and 502-4 is maintained, the transmitter 51 transmits the first packet 501-1. Through this operation, the transmitter 51 can transmit the first packets 501-1, 501-2, and 501-3 with a possible delay reduced.

The interfering transmitter 53 transmits interfering packets 503-1, 503-2, and 503-3. The transmission time of the interfering packet 503-1 does not overlap any of the transmission times of the first packets 501-1, 501-2, and 501-3 and the transmission times of the second packets 502-1, 502-2, 502-3, and 502-4, . . . Hence, the interfering packet 503-1 is transmitted without delay and does not delay any of the transmissions of the first packets 501-1, 501-2, and 501-3, and the second packets 502-1, 502-2, 502-3, 502-4, . . . .

The plurality of second packets preceding the first packet 501-2 is consecutively transmitted at the scheduled transmission time of the interfering packet 503-2. The interfering transmitter 53 determines that the channel is in the busy state depending on the reception power of the plurality of second packets, and thus delays the transmission of the interfering packet 503-2. Then, as described above, the transmitter 51 transmits the first packet 501-2 while the channel access right acquired for the plurality of second packets is maintained. Hence, the interfering transmitter 53 is precluded from transmitting the interfering packet 503-2 at least until the transmission of the first packet 501-2 is complete.

The interfering packet 503-3 is transmitted at the scheduled transmission time of the leading second packet 502-5 of the plurality of second packets preceding the first packet 501-3. The transmitter 51 determines that the channel is in the busy state depending on the reception power of the interfering packet 503-3, and thus delays the transmission of the plurality of second packets. In this case, when the transmission of the plurality of second packets is simply delayed, the transmission of the succeeding first packet 501-3 is inevitably delayed.

Thus, the transmitter 51 transmits the succeeding first packet 501-3 with the delay reduced by shortening the plurality of second packets. For example, the transmitter 51 shortens the second packet 502-5 by reducing the total number of second packets transmitted before the first packet 501-3 or replacing some or all of the second packets to be transmitted with other second packets. To allow a reduction in the total number of second packets transmitted before the first packet 501-3, for example, the transmission of some of the second packets may be delayed such that these second packets are transmitted after the first packet 501-3.

For example, upon receiving a notification of a wait time for the leading second packet from the access control unit 210, the scheduling unit 206 acquires, from the data storage unit 208, one or more second packets with a length suitable for the interval from the delayed transmission time of the leading second packet until the predicted transmission time of the first packet. The scheduling unit 206 then outputs the acquired one or more second packets to the transmission queue unit 209.

The scheduling unit 206 may individually adjust the lengths of the second packets through a re-fragmentation process or a change in the coding rate or the modulation scheme. The scheduling unit 206 may adjust the interval between the plurality of second packets. However, when an excessively long interval is set between the plurality of second packets, the interfering wireless communication apparatus may transmit an interfering packet during the interval. Thus, the interval between the plurality of second packets is preferably adjusted to at most the minimum value of an AIFS slot that can be adopted by the interfering wireless communication apparatus.

As illustrated in FIG. 4 and FIG. 5, the wireless communication apparatus according to the first embodiment can transmit the first packet with a possible delay reduced regardless of the operation of the interfering wireless communication apparatus inside or outside the cell. On the other hand, the interfering wireless communication apparatus may be subjected to a delay in the transmission of the interfering packet as a result of the transmission of the first packet. Thus, for example, the plurality of wireless communication apparatuses according to the first embodiment accommodated in the same cell may autonomously adjust the transmission times of the packets in order to mitigate unfairness regarding an opportunity to transmit a packet in the cell.

For example, upon receiving an ACK (ACKnowledgement) packet responding to a first packet transmitted at a certain transmission time (that is, the first packet has been successfully transmitted), the MAC unit or a higher processing unit of the wireless communication apparatus or a host apparatus connected to the wireless communication apparatus decides the transmission time of a future first packet based on the transmission time of the above-described first packet.

On the other hand, when failing to receive an ACK packet responding to the transmitted first packet, the wireless communication apparatus repeats retransmission of the first packet (and the preceding second packet) until the wireless communication apparatus receives the ACK packet.

Figure 6:
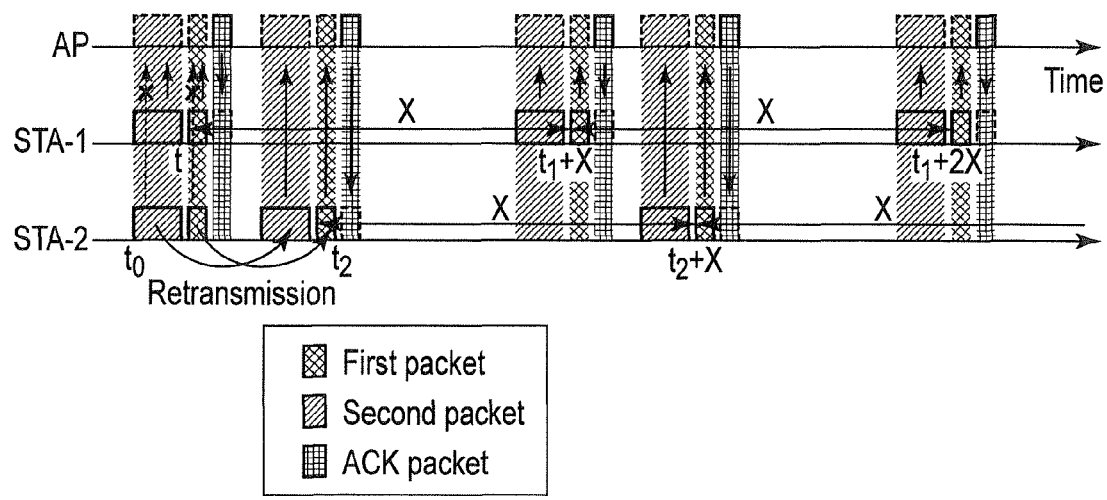
FIG. 6 is a diagram illustrating the operation of the wireless communication apparatus according to the first embodiment to the fourth embodiment.

Specifically, the wireless communication apparatus according to the first embodiment may operate as illustrated in FIG. 6. Each of STA-1 and STA2 in FIG. 6 corresponds to the wireless communication apparatus according to the first embodiment. Furthermore, AP in FIG. 6 may correspond to the wireless communication apparatus according to the first embodiment.

The STA-1 periodically transmits a first packet in accordance with the period X. Similarly, the STA-2 periodically transmits a first packet in accordance with the period X. The STA-1 transmits a second packet at time $t_0$ and then transmits a first packet at time $t_1$. Similarly, the STA-2 transmits a second packet at time $t_0$ and then transmits a first packet at time $t_1$. The AP succeeds in receiving the first packet from the STA-1 but fails to receive the first packet from the STA-2. As a result, the AP transmits an ACK packet to the STA-1 in response to the first packet from the STA-1.

Upon receiving the ACK packet, the STA-1 determines the transmission time of a future first packet to be $t_1+X$, $t_1+2X$, ... based on the transmission time $t_1$ of the above-described first packet associated with the ACK packet.

The STA-2 fails to receive an ACK packet responding to the first packet transmitted at time $t_1$, and thus retransmits the first packet (and the preceding second packet). The AP succeeds in receiving the first packet retransmitted by the STA-2 at time $t_2$. As a result, the AP transmits an ACK packet responding to the first packet to the STA-2.

Upon receiving the ACK packet, the STA-2 determines the transmission time of a future first packet to be $t_2+X$, $t_2+2X$, ... based on $t_2$, the transmission time of the first packet associated with the ACK packet.

By performing an operation illustrated in FIG. 6, the plurality of wireless communication apparatuses accommodated in the same cell can prevent packets in the cell from colliding against each other. To enhance the effect that prevents packets in the cell from colliding against each other, a technique disclosed in JP-A 2007-235445 (KOKAI) or any other technique may be applied as necessary. By further performing an operation illustrated in FIG. 4 or FIG. 5, the wireless communication apparatus according to the first embodiment can transmit the first packet with a possible delay reduced particularly regardless of interference from the interfering wireless communication apparatus outside the cell.

As described above, the wireless communication apparatus according to the first embodiment transmits a second packet before the predicted transmission time of a first packet. The wireless communication apparatus then transmits the first packet while a channel access right acquired for the second packet is maintained. Thus, the wireless communication apparatus can transmit the first packet with a possible delay reduced. The second packet preferably involves a larger amount of allowable delay than the first packet.

Furthermore, the wireless communication apparatus can decide the transmission time of a future first packet based on the transmission time of the successfully transmitted first packet. Thus, the wireless communication apparatus can prevent a possible collision with a packet from another wireless communication apparatus in the cell.

In a wireless LAN, when the channel is reserved for a given time utilizing a Network Allocation Vector (NAV), the other surrounding wireless communication apparatuses can be inhibited from transmitting packets. However, to allow this technique to be utilized, all the wireless communication apparatuses that need to be inhibited from transmitting packets need to be able to decode packets indicative of NAVs. That is, the other wireless communication apparatuses need to receive the packets indicative of NAVs at high communication quality without affecting decoding. Furthermore, when the interfering wireless communication apparatus forms a wireless communication system (for example, a ZigBee system) different from a wireless LAN, the interfering wireless communication apparatus fails to decode wireless LAN packets regardless of the communication quality.

On the other hand, upon receiving a second packet with a reception power at a level at which the interfering wireless communication apparatus determines that the channel is in the busy state, the wireless communication apparatus according to the first embodiment can inhibit the interfering wireless communication apparatus from transmitting interfering packets. That is, the communication quality needed for the second packet is lower than the communication quality needed for the packets indicative of NAVs. Thus, the wireless communication apparatus can transmit the first packet with a possible delay reduced more reliably than a technique that utilizes NAVs.

Second Embodiment

Figure 7:
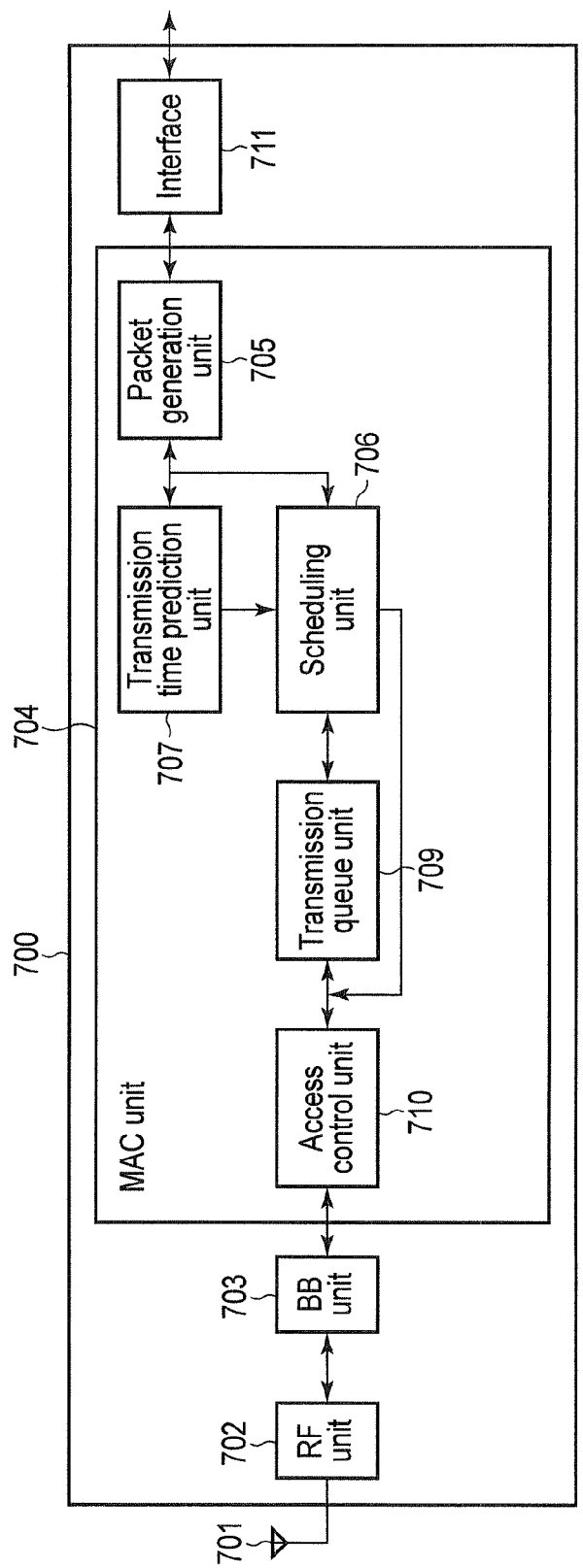
FIG. 7 is a block diagram illustrating a wireless communication apparatus according to the second embodiment.

As illustrated in FIG. 7, a wireless communication apparatus 700 according to a second embodiment comprises an antenna 701, an RF unit 702, a BB unit 703, a MAC unit 704, and an interface 711. The antenna 701, the RF unit 702, the BB unit 703, and the interface 711 are identical or similar to the antenna 201, the RF unit 202, the BB unit 203, and the interface 211 in FIG. 2.

The MAC unit 704 comprises a packet generation unit 705, a scheduling unit 706, a transmission time prediction unit 707, a transmission queue unit 709, and an access control unit 710. The MAC unit 704 need not include a functional unit corresponding to the data storage unit 208 in FIG. 2.

The functions of the MAC unit 704 can be described, for example, with reference to FIG. 8. In this case, the functions (805, 807, and 810) of the packet generation unit 705, the transmission time prediction unit 707, and the access control unit 710 are identical or similar to the functions (305, 307, and 310) of the packet generation unit 205, the transmission time prediction unit 207, and the access control unit 210.

The scheduling unit 706 inputs a packet from the packet generation unit 705. The scheduling unit 706 immediately outputs (maps) this input packet to one of a plurality of queues provided in the transmission queue unit 709 (806). To decide which of the queues the scheduling unit 706 outputs the input packet to, the scheduling unit 706 may determine whether or not the input packet corresponds to a first packet or whether or not the input packet corresponds to a second packet.

Moreover, the scheduling unit 706 selects one of the plurality of queues provided in the transmission queue unit 709 at an appropriate timing, and connects the selected queue to the access control unit 710 (806). That is, the scheduling unit 706 controls transfer of packets from the transmission queue unit 709 to the access control unit 710.

The appropriate timing may be determined based on a predicted transmission time from the transmission time prediction unit 707. For example, the scheduling unit 706 connects the queue in which the first packet is stored to the access control unit 710 at such a timing when the first packet is transmitted at the predicted transmission time. Similarly, the scheduling unit 706 connects the queue in which a packet (for example, the second packet) other than the first packet is stored to the access control unit 710 at such a timing when the packet is transmitted a predetermined time before the predicted transmission time.

The transmission queue unit 709 is identical or similar to the transmission queue unit 209 in FIG. 2 in that both transmission queue units comprise a plurality of queues with different priorities. However, the transmission queue unit 709 is different from the transmission queue unit 209 in FIG. 2 in that a timing when the packet is output by one of the plurality of queues is controlled by the scheduling unit 706 and in that the queue that outputs the packet at this timing is selected by the scheduling unit 706 (809).

As described above, in the wireless communication apparatus according to the second embodiment, the MAC unit controls the transfer of packets from the transmission queue unit to the access control unit. The wireless communication apparatus can exert effects identical or similar to the effects of the first embodiment without the need for the functional unit corresponding to the data storage unit in the wireless communication apparatus according to the first embodiment.

Third Embodiment

Figure 9:
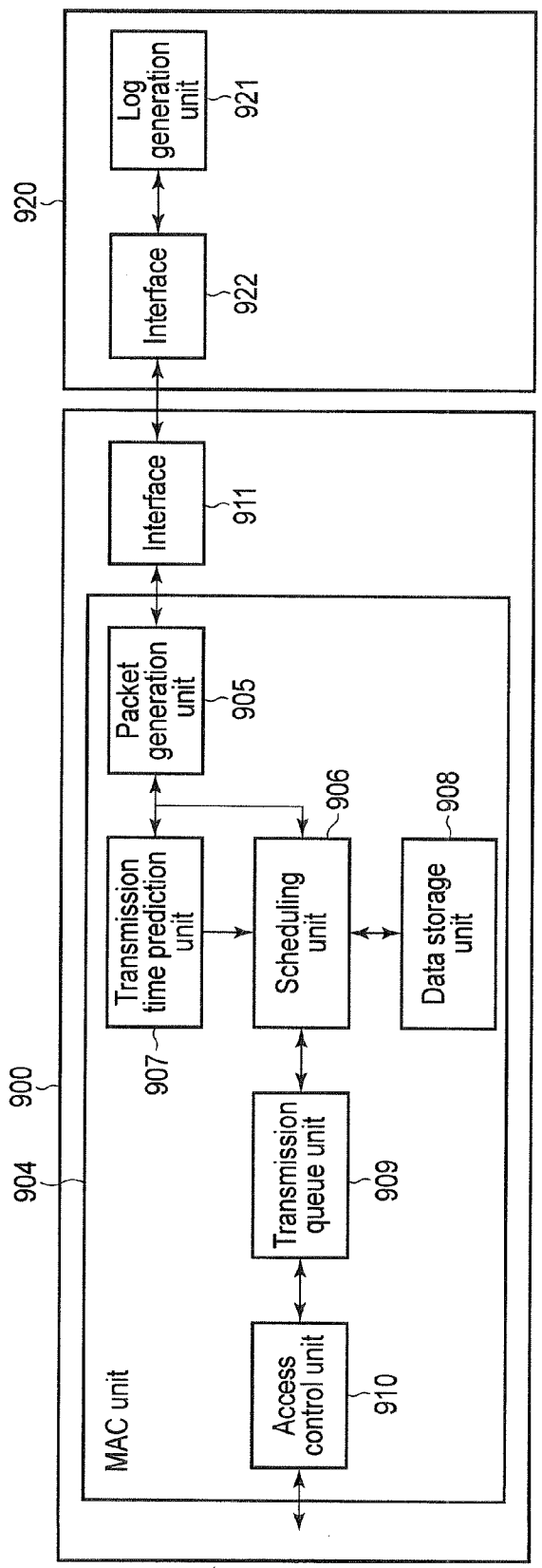
FIG. 9 is a block diagram illustrating a logging system according to the third embodiment.

As illustrated in FIG. 9, a logging system according to a third embodiment comprises a wireless communication apparatus 900 and a host apparatus 920.

The wireless communication apparatus 900 comprises a MAC unit 904 and an interface 911. Moreover, the wireless communication apparatus 900 may comprise functional units identical or similar to the antenna 201, the RF unit 202, and the BB unit 203 in FIG. 2 (or the antenna 701, the RF unit 702, and the BB unit 703 in FIG. 7). The wireless communication apparatus 900 may be identical or similar to the wireless communication apparatus 200 in FIG. 2 or to the wireless communication apparatus 700 in FIG. 7.

The interface 911 connects the MAC unit 904 to the host apparatus 920 (more specifically, an interface 922 described below).

The host apparatus 920 comprises a log generation unit 921 and the interface 922. The interface 922 connects the log generation unit 921 to the wireless communication apparatus 900 (more specifically, the interface 911).

The log generation unit 921 generates log information. The log information may be optional and is indicative of, for example, a history of operation of the host apparatus 920. Upon receiving, via the interface 922, a notification indicating that a channel access right has been acquired for a second packet, the log generation unit 921 uses the notification as a trigger to generate log information. The log generation unit 921 outputs log information to the wireless communication apparatus 900 via the interface 922.

The MAC unit 904 comprises a packet generation unit 905, a scheduling unit 906, a transmission time prediction unit 907, a data storage unit 908, a transmission queue unit 909, and an access control unit 910. The MAC unit 904 may be identical or similar to the MAC unit 204 in FIG. 2 (or the MAC unit 704 in FIG. 7).

Upon acquiring the channel access right for the second packet, the MAC unit 904 notifies the host apparatus 920 that the channel access right has been acquired for the second packet. Furthermore, the MAC unit 904 inputs the log information from the host apparatus 920 via the interface 911 and packetizes the log information. The MAC unit 904 then uses the packetized log information as the first packet.

The logging system in FIG. 9 may operate as illustrated in FIG. 10. The scheduling unit 906 acquires the second packet stored in the data storage unit 908 in advance, and outputs the acquired second packet to (stores the acquired second packet in) one of the plurality of queues provided in the transmission queue unit 909.

The second packet stored in the transmission queue unit 909 is transferred to the access control unit 910 and then transmitted in accordance with the CSMA scheme. When the channel access right is acquired for the second packet, the access control unit 910 notifies, via the scheduling unit 906 and the interface 911, the host apparatus 920 that the channel access right is acquired for the second packet.

Upon being notified, via the interface 922, that the channel access right has been acquired for the second packet, the log generation unit 921 generates and outputs log information to the wireless communication apparatus 900 via the interface 922.

The packet generation unit 905 inputs the log information from the host apparatus 920 via the interface 911 and packetizes the log information to generate a first packet. Then, the scheduling unit 906 outputs the first packet to one of the plurality of queues provided in the transmission queue unit 909.

The transmission queue unit 909 transfers the first packet to the access control unit 910. The channel access right acquired for the second packet is maintained at least at this point in time. The access control unit 910 can immediately transmit the first packet (can transfer the first packet to a BE unit (not shown in the drawings)). How long the channel access right needs to be maintained depends on the implementation of the logging system in FIG. 9.

An effective technique for maintaining the channel access right for a long time is to set a large length for the second packet or to consecutively transmit a plurality of second packets. When a plurality of second packets are continuously transmitted, the interval between packets is preferably set to a sufficiently small value to preclude the interfering wireless communication apparatus from transmitting a packet during the interval.

As described above, the logging system according to the third embodiment acquires a channel access right for a second packet and generates log information using, as a trigger, a notification indicating that the channel access right has been acquired. The acquired channel access right is maintained until the log information is transmitted as a first packet. Hence, the logging system can stably transmit the log information with a possible delay reduced, while utilizing the wireless communication system based on the existing CSMA scheme.

Fourth Embodiment

Figure 11:
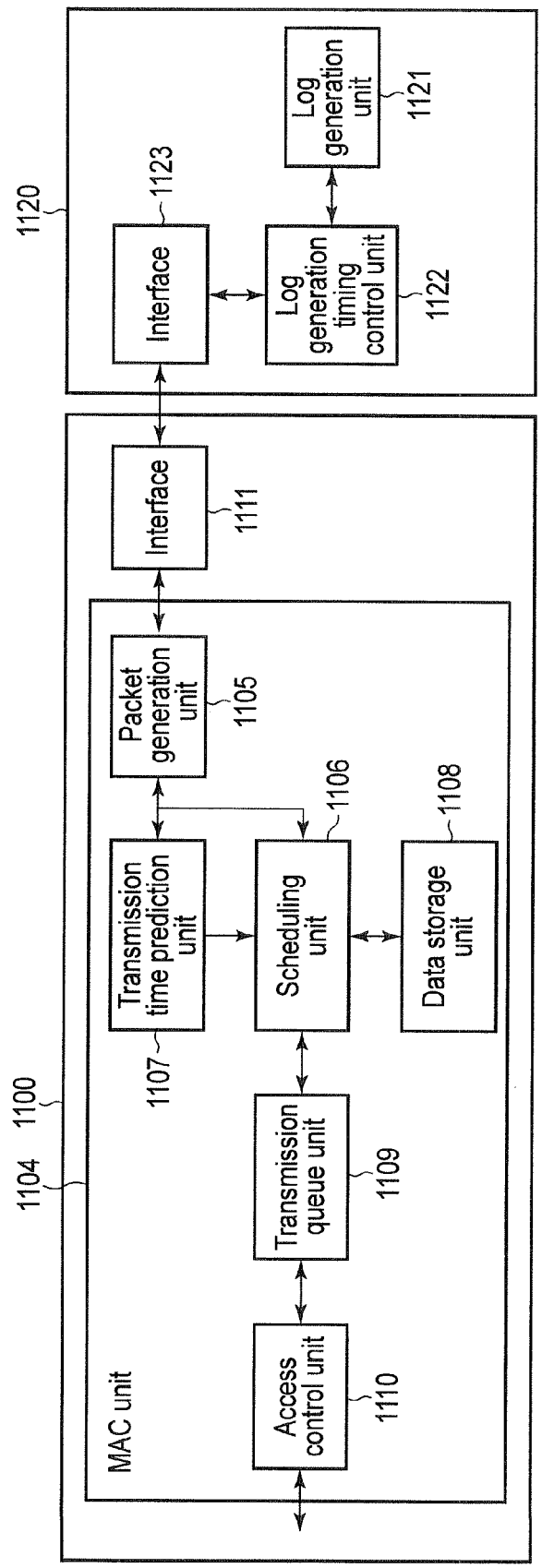
FIG. 11 is a block diagram illustrating a logging system according to the fourth embodiment.

As illustrated in FIG. 11, a logging system according to a fourth embodiment comprises a communication apparatus 1100 and a host apparatus 1120.

The wireless communication apparatus 1100 comprises a MAC unit 1104 and an interface 1111. Moreover, the wireless communication apparatus 1100 may comprise functional units identical or similar to the antenna 201, the RF unit 202, and the BB unit 203 in FIG. 2 (or the antenna 701, the RF unit 702, and the BB unit 703 in FIG. 7). The wireless communication apparatus 1100 may be identical or similar to the wireless communication apparatus 200 in FIG. 2 or to the wireless communication apparatus 700 in FIG. 7.

The interface 1111 connects the MAC unit 1104 to the host apparatus 1120 (more specifically, an interface 1123 described below).

The host apparatus 1120 comprises a log generation unit 1121, a log generation timing control unit 1122, and the interface 1123. The interface 1123 connects the log generation timing control unit 1122 to the wireless communication apparatus 1100 (more specifically, the interface 1111).

The log generation unit 1121 generates log information. The log information may be optional and is indicative of, for example, a history of operation of the host apparatus 1120. The log generation unit 1121 generates log information at a timing specified by the log generation timing control unit 1122. Specifically, upon receiving, from the log generation timing control unit 1122, a notification indicating that a log generation timer described below has timed out, the log generation unit 1121 uses the notification as a trigger to generate log information. The log generation unit 1121 outputs the log information to the wireless communication apparatus 1100 via the log generation timing control unit 1122 and the interface 1123.

The log generation timing control unit 1122 controls a timing at which the log generation unit 1121 generates log information. Specifically, the log generation timing control unit 1122 inputs, via the interface 1123, information indicative of the transmission time of a future first packet decided by the wireless communication apparatus 1100. The log generation timing control unit 1122 sets the log generation timer based on the transmission time of the first packet. When the log generation timer times out, the log generation timing control unit 1122 notifies the log generation unit 1121 that the log generation timer has timed out.

According to the fourth embodiment, the log information serving as the first packet is periodically transmitted. Hence, when the log generation timer times out, the log generation timing control unit 1122 re-sets the log generation timer.

The MAC unit 1104 comprises a packet generation unit 1105, a scheduling unit 1106, a transmission time prediction unit 1107, a data storage unit 1108, a transmission queue unit 1109, and an access control unit 1110. The MAC unit 1104 may be identical or similar to the MAC unit 204 in FIG. 2 (or the MAC unit 704 in FIG. 7).

The logging system in FIG. 11 may operate as illustrated in FIG. 12. In the operation illustrated in FIG. 12, upon receiving an ACK packet responding to a first packet transmitted at a certain transmission time, the wireless communication apparatus 1100 decides the transmission time of a future first packet based on the certain transmission time, as described in the first embodiment.

The wireless communication apparatus 1100 receives the ACK packet responding to the first packet transmitted at the certain transmission time. Then, the wireless communication apparatus 1100 decides the transmission time of the future first packet based on the transmission time of the first packet associated with the received ACK packet. The wireless communication apparatus 1100 then notifies the host apparatus 1120 of the transmission time of the future first packet via the interface 1111. Upon receiving the notification of the transmission time of the future first packet via the interface 1123, the log generation timing control unit 1122 sets the log generation timer.

Subsequently, the wireless communication apparatus 1100 and the host apparatus 1120 repeats the processing described below as long as an ACK packet can be received in response to a transmitted first packet.

When the log generation timer times out, the log generation timing control unit 1122 notifies the log generation unit 1121 that the log generation timer has timed out. The log generation unit 1121 uses the notification as a trigger to generate log information. The log generation unit 1121 then outputs the log information to the wireless communication apparatus 1100 via the log generation timing control unit 1122 and the interface 1123. On the other hand, the wireless communication apparatus 1100 treats the decided transmission time of a first packet as a predicted transmission time and transmits a second packet before the predicted transmission time. Then, while a channel access right acquired for the second packet is maintained, the wireless communication apparatus 1100 transmits the first packet generated by packetizing the log information from the host apparatus 1120.

As described above, in the logging system according to the fourth embodiment, the host apparatus generates log information at a timing based on the transmission time of a future first packet decided by the wireless communication apparatus. On the other hand, the wireless communication apparatus transmits a second packet before the transmission time of the future first packet. The wireless communication apparatus transmits the log information from the host apparatus as the first packet while a channel access right acquired for the second packet is maintained. Hence, the logging system can stably transmit the log information with a possible delay reduced, while utilizing the wireless communication system based on the existing CSMA scheme. Furthermore, in the logging system, the host apparatus generates log information in a timely manner based on the transmission time of a future first packet. Thus, compared to the logging system according to the third embodiment, the logging system according to the fourth embodiment eliminates the need to maintain the channel access right over a long time, relaxing the constraint on the length of the second packet.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

Each wireless communication apparatuses and the logging systems according to above-described embodiments may be partly or wholly implemented as an integrated circuit such as an LSI (Large Scale Integration), or an IC (Integrated Circuit) chip set. Each of functional units may implement a processor separately. Alternatively, the functional units may be partly or wholly integrated to implement a processor. Instead of an LSI, an ASIC (Application Specific Integrated Circuit) or a general purpose processor may be used to implement an integrated circuit.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
   a packet generator configured to packetize data;
   a queue unit configured to temporarily store a packet to be transmitted;
   a predictor configured to predict a transmission time of a first packet to obtain a first time, the first time being a predicted transmission time of the first packet at which the first packet is to be transmitted; and
   a scheduler configured to output a second packet to the queue unit at a second time, the second time being earlier than the predicted transmission time of the first packet such that the second packet is transmitted before the predicted transmission time of the first packet,
   wherein an interval from a third time when transmission of the second packet is complete to the predicted transmission time of the first packet is equal to or shorter than a predetermined period, and
   wherein the second packet involves a larger amount of allowable delay than the first packet or corresponds to dummy data.

2. The apparatus according to claim 1, further comprising:
   a Radio Frequency (RF) unit configured to carry out carrier sense; and
   an access control unit configured to decide a wait time for the second packet based on a result of the carrier sense and delay the transmission of the second packet by the wait time when a channel is determined to be in a busy state during the carrier sense,
   wherein the scheduler allows the packet generator to carry out a re-fragmentation process on the second packet based on the wait time, to shorten the second packet.

3. The apparatus according to claim 1, further comprising:
   a Radio Frequency (RF) unit configured to carry out carrier sense; and
   a Baseband (BB) unit configured to encode and modulate the first packet and the second packet; and
   an access control unit configured to decide a wait time for the second packet based on a result of the carrier sense and delay the transmission of the second packet by the wait time when a channel is determined to be in a busy state during the carrier sense,
   wherein the scheduler allows the BB unit to change at least one of a coding rate and a modulation scheme applied to the second packet based on the wait time, to shorten the second packet.

4. The apparatus according to claim 1, further comprising:
   a Radio Frequency (RF) unit configured to carry out carrier sense; and
   an access control unit configured to decide a wait time for the second packet based on a result of the carrier sense and delay the transmission of the second packet by the wait time when a channel is determined to be in a busy state during the carrier sense,
   wherein the scheduler replaces at least a portion of the second packet based on the wait time, to shorten the second packet.

5. The apparatus according to claim 1, wherein an interval between the second time and the predicted transmission time of the first packet is equal to or longer than a maximum length of a packet that is able to be set for at least one wireless communication system based on a Carrier Sense Multiple Access (CSMA) scheme.

6. The apparatus according to claim 1, wherein an interval between the second time and the predicted transmission time of the first packet is equal to or longer than a maximum length of time for which a channel is continuously determined to be in a busy state during pre-executed carrier sense.

7. The apparatus according to claim 1, wherein a channel with a short maximum length of time for which a channel is continuously determined to be in a busy state during pre-executed carrier sense is preferentially used to transmit the first packet and the second packet.

8. The apparatus according to claim 1, wherein the first packet is periodically transmitted according to a given period, and
   wherein an interval between the second time and the predicted transmission time of the first packet is equal to or shorter than a length of time resulting from a subtraction of a length of the first packet from a length of time resulting from a division of a period of the first packet by a number of wireless communication apparatuses accommodated in a cell identical to a cell of the wireless communication apparatus.

9. The apparatus according to claim 1, further comprising an access control unit configured to notify the scheduler that a channel access right has been acquired for the second packet,
   wherein an interval between the second time and the predicted transmission time of the first packet is equal to or longer than a length of time after the scheduler is notified that the channel access right has been acquired and before the first packet is input to the access control unit.

10. The apparatus according to claim 1, further comprising a storage unit configured to temporarily store the second packet.

11. The apparatus according to claim 1, wherein the first packet is periodically transmitted in accordance with a given period, and when an ACK packet is received in response to a transmitted first packet, a transmission time of a future first packet is decided based on a transmission time of the transmitted first packet.

12. The apparatus according to claim 1, wherein the packet generator, the predictor and the scheduler are implemented as a processor.

13. The apparatus according to claim 1, wherein the packet generator, the predictor and the scheduler are implemented as a circuit.

14. A logging system comprising:
    the wireless communication apparatus according to claim 9; and
    a host apparatus which is connected to the wireless communication apparatus,
    wherein the host apparatus comprises a log generator configured to generate log information upon receiving, from the wireless communication apparatus, a notification that the channel access right has been acquired, and
    wherein the packet generator generates the first packet by packetizing the log information.

15. A logging system comprising:
the wireless communication apparatus according to claim 11; and
a host apparatus which is connected to the wireless communication apparatus,
wherein the host apparatus comprises:
   a log generator configured to generate log information; and
   a timing control unit configured to control a timing when the log information is generated based on a transmission time of the future first packet, and
wherein the packet generator generates the first packet by packetizing the log information.

\* \* \* \* \*